UNITED STATES PATENT OFFICE.

JOHN P. GRIESS, OF BURTON-ON-TRENT, GREAT BRITAIN, ASSIGNOR TO BADISCHE ANILIN AND SODA FABRIK, OF BADEN, GERMANY.

IMPROVEMENT IN COLORING-MATTERS.

Specification forming part of Letters Patent No. 213,564, dated March 25, 1879; application filed January 29, 1879.

*To all whom it may concern:*

Be it known that I, JOHN PETER GRIESS, of Burton-on-Trent, in the county of Stafford, England, have invented a new and useful Improvement in Dye-Stuffs or Coloring-Matters, which improvement is fully set forth in the following specification.

This invention relates to a red coloring-matter or dye-stuff, which may be termed "anisol-red," and which is capable of replacing cochineal, lac-dye, or similar dies in some of their industrial applications.

The said coloring-matter belongs to the class of the so-called azo-compounds, and results from the action of diazo-anisol upon an alkaline solution of the monosulpho-acid of naphthol.

In carrying out my invention I take the substance known to chemists as "anisidine"—that is to say, the amido-compound of anisol—and I first prepare a hydrochlorate of diazo-anisol by treating a cold and aqueous solution of hydrochlorate of anisidine with nitrous acid until the latter ceases to be absorbed. I then mix the solution of, say, about one molecule of the hydrochlorate of diazo-anisol thus obtained with an alkaline solution of about one molecule of the monosulpho-acid of naphthol, (beta-naphthol being employed by preference,) and I take care to keep the mixture slightly alkaline until the close of the operation.

From the action of the diazo-anisol upon the above-named solution of monosulpho-acid of naphthol results the anisol-red, which may be prepared for commerce by precipitating it from the mixture by means of common salt or otherwise, and the precipitate thus formed may be filtered and dried.

By substituting in the above process disulpho-acid of naphthol for the monosulpho-acid a different coloring-matter is produced, which may be termed "anisol-crimson," and which forms the subject-matter of a different application for a patent.

The anisol-red prepared by the above process is the alkaline salt of a strong organic sulpho-acid. Its chief characteristics are the following: It has the appearance of a dark-red crystalline powder, which is soluble in water and alcohol, but insoluble in hydrocarbons. The color of the solution in water or alcohol is red, and is changed by an excess of alkali into a yellowish tint. Mineral acids in excess turn the solution purple. The anisol-red dissolves in concentrated sulphuric acid with a bright purple color. Reducing agents, such as protochloride of tin or tin crystals, decolorize the solution and regenerate anisidine, which may be separated from the mixture by adding an excess of caustic alkali, whereby the said organic bases are set free, and may be obtained in a pure state by distillation or extraction.

For dyeing animal fiber the anisol-red is employed in an acid dye-bath, with or without the presence of metallic mordants; and the anisol-red may also be used for dyeing cotton by employing its property of forming insoluble compounds with some metallic salts—such, for instance, as aluminate of zinc.

What I claim as new, and desire to secure by Letters Patent, is—

As a new manufacture, the red coloring-matter produced by the action of the diazo-anisol upon an alkaline solution of the mono-sulpho-acid of beta-naphthol, substantially as described, or by any other means which will produce a like result.

In testimony that I claim the foregoing I have hereunto set my hand this 1st day of January, 1879.

JOHN PETER GRIESS.

Witnesses:
 J. BRAME,
 C. ALLENDER.